Oct. 17, 1939.                    W. J. SMITH                    2,176,280
                        ACCELERATOR AND BRAKE CONTROL
                            Filed Feb. 26, 1938
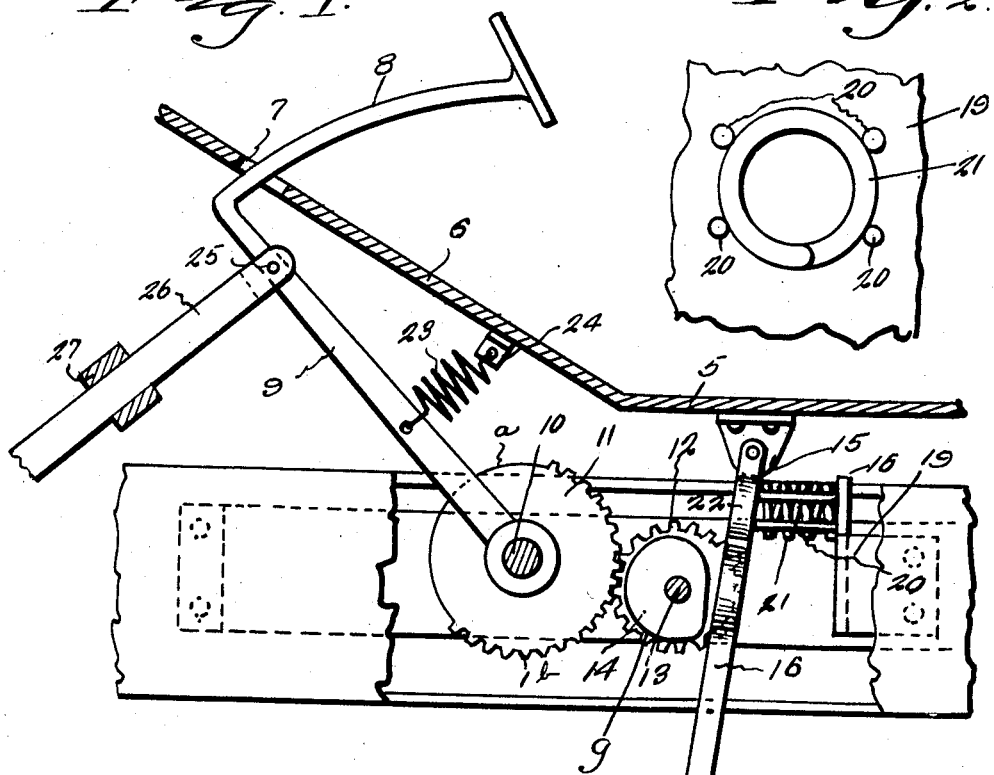
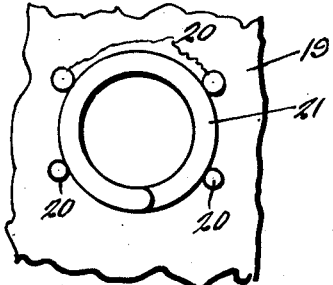
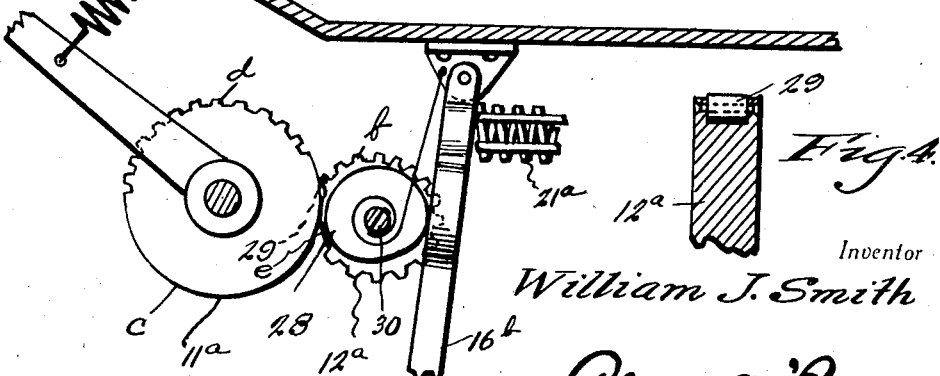
Inventor
William J. Smith
By Clarence A. O'Brien
Hyman Berman
Attorneys Patented Oct. 17, 1939

2,176,280

UNITED STATES PATENT OFFICE 2,176,280

ACCELERATOR AND BRAKE CONTROL

William J. Smith, Delaware City, Del.

Application February 26, 1938, Serial No. 192,878

17 Claims. (Cl. 192—3)

This invention appertains to new and useful improvements whereby the usual automobile accelerator and brakes can be controlled through the actuation of a single foot pedal.

The principal object of the present invention is to provide a single pedal having means associated therewith so that when the pedal is depressed acceleration is accomplished and upon releasement of the pedal brake action automatically takes place.

Other objects and advantages of the invention will become apparent to the reader of the following specification.

In the drawing:

Figure 1 represents a vertical sectional view through parts of the mechanism.

Figure 2 is a fragmentary end elevational view of the brake spring.

Figure 3 is a vertical sectional view through the floor and toe boards of an automobile body showing the mechanism in side elevation (second form).

Figure 4 is a fragmentary detailed sectional view showing the roller on the cam (second form).

Referring to the drawing wherein like numerals designate like parts, it can be seen that numeral 5 denotes the usual floor board while numeral 6 is the toe board having the opening 7 therein and through which the foot pedal shank 8 extends. This shank 8 is at the upper end of the elongated arm 9 carried by the shaft 10. On the shaft 10 is secured the mutilated gear 11 meshing with the gear 12 on the countershaft 13 with the cam 14 the same having the smooth extent a, and the toothed portion 1b. A bracket 15 on the underside of the floor board 5 has the upper end of the link 16 pivotally secured thereto. The lower end of the link 16 has a connection 17 to the usual brake operating rod 18. An adjustable cage structure 19 includes pins 20 extending therefrom to serve as guides for the substantially strong spring 21 which bears against the thickened portion 22 of the arm 16 so as to normally tend to urge the arm toward the cam 14 and in moving the rod 18 to actuate the brakes.

Numeral 23 denotes a spring in connection between the arm 9 and the bracket 24 on the underside of the toe board 6.

Held by guide 27, fastened to the vehicle frame is a sliding arm 26 connected to accelerator control, this is connected to and adapted for operation by the arm 9 of the pedal.

Obviously, when the pedal 8 is forced downwardly the rod 26 will move through guide 27 so that the accelerator control is operated. When this occurs, the cam 14 has been rotated so that its edge portion g which is of constant radius rides against the link 16 resulting in compression of the spring 20 and retention of the brakes in unapplied position. It is to be observed that the spring impinges against the link 16 close to the fulcrum point thereof with the cam 14 ridable against the link at a point below the spring so as to secure more exacting control by cam and more nearly constant spring tension of a application of brakes by reducing the displacement through which the spring has to move during application of the brakes. The two fundamental features of this invention are (1) to reduce as nearly as possible the loss of spring compression at the position it is most desired full application of brakes. By this arrangement displacement of the spring is reduced to a minimum, therefore, spring force is almost constant (2) and the use of a gear train in conjunction with the cam so as to utilize as nearly as possible the entire cam surface which is impossible through the small angle it is desired to rotate the foot to secure braking control. The use of a large portion of cam circumference is a fundamental necessity from cam design. In form 1, Figures 1 and 2 approximately one-half of cam circumference is used for braking control while in second form Figures 3 and 4 the entire circumference is available.

Upon releasement of the pedal 8, the spring 23 will pull the same upwardly and result in the returning of the cam 14 to the position shown in Figure 1 whereupon this spring 21 is released and forces the link 16 forwardly, pulling on the rod 18 and resulting in the operation of the brakes.

A modified form of the invention is shown in Figures 3 and 4, wherein the smooth portion c of the wheel 11a forms a continuation of the outer circumference of the tooth portion d. In this connection it will be observed that the gear 12a has an interrupted portion e for receiving a portion of the smooth area of the wheel 11a when the wheel 11a has been rotated to a degree unmeshing the toothed portion d and f of the wheels 11a and 12a.

Obviously, when the wheel 11a has been rotated so that the toothed portion d has moved from the toothed portion f, the smooth portion c will be riding against the roller 29 on one of the end teeth of the toothed portion f and in the interrupted portion c, thus preventing rotation of the wheel 12a and holding the cam bearing against the link 16a to hold the brakes in unapplied position while the arm 9 is free to be rotated in operating the accelerator control means 26—27. A coiled spring about shaft f cam, 28 maintains roller 29 against surface c of large gear 11a so that engagement of gears 11a and 12a is insured when arm 9 is rotated clockwise.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A control for accelerator and brake mechanisms comprising a pedal, a brake control lever, spring means engaging the lever for operating the lever to brake applied position, and a gear train between the pedal and the lever and including a cam for operating the lever.

2. A control for accelerator and brake mechanisms comprising a pedal, a brake control lever, spring means engaging the lever for operating the lever to brake applied position, and a gear train between the pedal and the lever and including a cam for operating the lever, said pedal being adapted to operate the accelerator mechansm.

3. A control for accelerator and brake mechanisms comprising a pedal, a brake control lever, spring means engaging the lever for releasing the lever to brake applied position, and a gear train between the pedal and the lever and including a cam for operating the lever, said pedal being adapted to operate the accelerator mechanism, said cam having a portion thereof adapted to clear the lever when the pedal is being released to actuate the brake mechanism.

4. A control for accelerator and brake mechanisms comprising a manually controlled member, a brake control lever, spring means associated with the lever for releasing the lever to brake applied position, and a gear train between the pedal and the lever and including a cam for operating the lever, said cam having a portion thereof adapted to clear the lever when the pedal is being released to actuate the brake mechanism.

5. A control for accelerator and brake mechanisms comprising a manually operated member, a connection between the manually operated member and one of the mechanisms, and a gear train between the manually operated member and the other mechanism, said last-mentioned mechanism being the brake mechanism and spring means associated therewith for normally tending to operate the mechanism to brake applied position.

6. A control for accelerator and brake mechanisms comprising a manually operated member, a connection between the manually operated member and one of the mechanisms, and a speed increasing unit between the manually operated member and the other mechanism, said last-mentioned mechanism being the brake mechanism and spring means associated therewith for normally tending to operate the mechanism to brake applied position, and cam means associated with the speed increasing unit for overcoming the spring means and releasing the brake mechanism when the manually operated member is actuated.

7. A control for accelerator and brake mechanisms comprising a pedal, a brake control lever, spring means engaging the lever for operating the lever to brake applied position, and a gear train between the pedal and the lever and including a cam for operating the lever, said pedal being adapted to operate the accelerator mechanism, said lever being fulcrumed at one end, said spring means impinging against the lever.

8. A control for accelerator and brake mechanisms comprising a pedal, a brake control lever, spring means engaging the lever for operating the lever to brake applied position, and a gear train between the pedal and the lever and including a cam for operating the lever, said pedal being adapted to operate the accelerator mechanism, said lever being fulcrumed at one end, said spring means impinging against the lever at a point between the fulcrum and the cam.

9. A control for accelerator and brake mechanisms comprising a pedal, a brake control lever, spring means engaging the lever for operating the lever to brake applied position, and a gear train between the pedal and the lever and including a cam for operating the lever, said pedal being adapted to operate the accelerator mechanism, said lever being fulcrumed at one end, said spring means impinging against the lever at a point in close proximity to the fulcrum of said lever.

10. A control for accelerator and brake mechanisms comprising a pedal, a wheel rotated by the pedal, said wheel having a smooth portion and a toothed portion, a second wheel provided with teeth meshing with the teeth of the wheel, a cam carried by the second-mentioned wheel, a swingable lever, spring means for urging the lever toward the cam, said lever being provided with brake connecting means, said spring being adapted to operate the lever to brake applied position, said cam being operative against the lever when the pedal is operated to actuate the accelerator control for moving and retaining the lever to brake unapplied position.

11. A control for accelerator and brake mechanisms comprising a pedal, a wheel rotated by the pedal, said wheel having a smooth portion and a toothed portion, a second wheel provided with teeth meshing with the teeth of the wheel, a cam carried by the second-mentioned wheel, a swingable lever, spring means for urging the lever toward the cam, said lever being provided with brake connecting means, said spring being adapted to operate the lever to brake applied position, said cam being operative against the lever when the pedal is operated to actuate the accelerator control for moving and retaining the lever at brake unapplied position, the smooth portion of the first-mentioned wheel forming a continuation of the outer circumference of the toothed portion of the wheel, the second wheel provided with an interrupted portion in its teeth for receiving a portion of the smooth portion of the first-mentioned wheel when the first-mentioned wheel is rotated to operate the accelerator control.

12. A control for accelerator and brake mechanisms comprising a pedal, a wheel rotated by the pedal, said wheel having a smooth portion and a toothed portion, a second wheel provided with teeth meshing with the teeth of the wheel, a cam carried by the second-mentioned wheel, a swingable lever, spring means for urging the lever toward the cam, said lever being provided with brake connecting means, said spring being adapted to operate the lever to brake applied position, said cam being operative against the lever when the pedal is operated to actuate the accelerator control for moving and retaining the lever at brake unapplied position, the smooth portion of the first-mentioned wheel forming a continuation of the outer circumference of the toothed portion of the wheel, the second wheel provided with an interrupated portion in its teeth for receiving a portion of the smooth portion of the first-mentioned wheel when the first-mentioned wheel is rotated to operate the accelerator control, said lever being provided with spring means for maintaining the lever in brake applied position, at a predetermined position of the cam.

13. A control for accelerator and brake mechanisms comprising a pedal, a wheel rotated by the pedal, said wheel having a smooth portion and a toothed portion, a second wheel provided with teeth meshing with the teeth of the wheel, a cam carried by the second-mentioned wheel, a swingable lever, spring means for urging the lever toward the cam, said lever being provided with brake connecting means, said spring being adapted to operate the lever to brake applied position, said cam being operative against the lever when the pedal is operated to actuate the accelerator control for moving the lever to brake unapplied position, the smooth portion of the first-mentioned wheel forming a continuation of the outer circumference of the toothed portion of the wheel, the second wheel provided with an interrupted portion in its teeth for receiving a portion of the smooth portion of the first-mentioned wheel when the first-mentioned wheel is rotated to operate the accelerator control, and a roller on the second-mentioned wheel at its interrupted portion for riding engagement with the smooth portion of the first-mentioned wheel.

14. A control for accelerator and brake mechanisms comprising a manually operative member, spring means for holding one of the mechanisms in operated position, and gear means between the manually operative member and the spring means for overcoming the spring means at a predetermined movement of the manually operative member.

15. A control for accelerator and brake mechanisms comprising a manually operative member, spring means for holding one of the mechanisms in operated position, and gear means between the manually operative member and the spring means for overcoming the spring means at a predetermined movement of the manually operative member, and spring means for tensioning the manually operative member in the opposite direction.

16. A control for accelerator and brake mechanisms comprising a pedal, a cam engaging and controlling a brake mechanism, a spring for applying said brake mechanism and a gear train between said pedal and cam.

17. A control for accelerator and brake mechanisms comprising a pedal, a cam to engage in control a brake control mechanism, a spring for applying said brake mechanism, a gear train between said pedal and cam and a means for operating an accelerator control mechanism by said pedal.

WILLIAM J. SMITH.